United States Patent [19]

Benguerel et al.

[11] Patent Number: 4,685,934
[45] Date of Patent: Aug. 11, 1987

[54] MONO- AND DI-SULFO GROUP CONTAINING COMPOUND HAVING A SUBSTITUTED PYRAZOLYL DIAZO COMPONENT RADICAL AND THEIR USE

[75] Inventors: Francois Benguerel, Oberwil, Switzerland; Roland Mislin, Village-Neuf, France

[73] Assignee: Sandoz Ltd., Basel, Switzerland

[21] Appl. No.: 754,533

[22] Filed: Jul. 12, 1985

[30] Foreign Application Priority Data

Jul. 14, 1984 [DE] Fed. Rep. of Germany ....... 3426069

[51] Int. Cl.$^4$ ................... C09B 29/036; C09B 29/09; C09B 29/30; C09B 29/36
[52] U.S. Cl. .......................................... 8/684; 8/681; 8/682; 8/683; 8/929; 534/740; 534/743; 534/753; 534/765; 534/766; 534/768; 534/769; 534/770; 534/773; 534/778; 534/780; 534/781; 534/785; 534/786; 534/792; 534/793; 544/375
[58] Field of Search ..................... 534/753, 765, , 766, 534/768, 740, 773, 778, 780, 781, 792, 793, 785; 8/684, 681, 682, 683, 929

[56] References Cited

U.S. PATENT DOCUMENTS

| | | | |
|---|---|---|---|
| 3,639,384 | 2/1972 | Weaver et al. | 534/793 X |
| 3,639,385 | 2/1972 | Weaver et al. | 534/793 X |
| 4,101,540 | 7/1978 | Coispeau | 534/765 X |
| 4,282,144 | 8/1981 | Weaver et al. | 534/781 X |
| 4,459,229 | 7/1984 | Weaver et al. | 260/152 |

FOREIGN PATENT DOCUMENTS

| | | | |
|---|---|---|---|
| 0020161 | 12/1980 | European Pat. Off. | 534/768 |
| 0017558 | 10/1983 | European Pat. Off. | 534/768 |

Primary Examiner—Floyd D. Higel
Attorney, Agent, or Firm—Gerald D. Sharkin; Richard E. Vila; Melvyn M. Kassenoff

[57] ABSTRACT

Monoazo compounds of formula

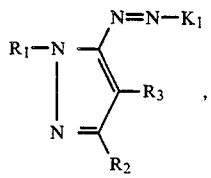

wherein
$R_1$ is a coupling component radical,
$R_1$ is $C_{1-6}$alkyl; $C_{1-6}$alkyl substituted by 1 or 2 substituents selected from chloro, cyano, hydroxy, $C_{1-4}$alkoxy, phenyl and phenyl substituted by 1 or 2 substituents selected from chloro, $C_{1-4}$alkyl, $C_{1-4}$alkoxy, carboxy, sulfo, sulfamoyl and acetamido; $C_{5-7}$cycloalkyl; $C_{5-7}$cycloalkyl substituted by 1 to 3 $C_{1-4}$alkyl groups; phenyl; phenyl substituted by 1 to 3 substituents selected from chloro, $C_{1-4}$alkyl, $C_{1-4}$alkoxy, acetamido (maximum of 1), carboxy (maximum of 1), sulfo (maximum of 1) and —SO$_2$NR$_7$R$_8$ (maximum of 1); 1- or 2-naphthyl or 1- or 2-naphthyl substituted by sulfo,
wherein
each of $R_7$ and $R_8$ is independently hydrogen; $C_{1-4}$alkyl; $C_{1-4}$alkyl monosubstituted by hydroxy or phenyl; cyclohexyl; phenyl or phenyl monosubstituted by chloro, methyl or methoxy, or
—NR$_7$R$_8$ is a 5- or 6-membered saturated or unsaturated ring containing 1 or 2 hetero atoms,
$R_2$ is hydrogen; $C_{1-4}$alkyl; $C_{1-4}$alkyl monosubstituted by hydroxy, chloro, cyano, $C_{1-4}$alkoxy, phenyl or phenyl substituted by 1 or 2 substituents selected from chloro, methyl, methoxy, sulfo and sulfamoyl; $C_{1-4}$alkoxy; cyano; phenyl; phenoxy; or phenyl or phenoxy monosubstituted by chloro, methyl, methoxy or sulfo, and
$R_3$ is cyano, carbamoyl, —COOR$_4$, sulfo or —CO$_2$NR$_5$R$_6$,
wherein
$R_4$ is hydrogen, $C_{1-4}$alkyl, phenyl or phenyl($C_{1-4}$alkyl), and
each of $R_5$ and $R_6$ is independently hydrogen; $C_{1-4}$alkyl; $C_{1-4}$alkyl monosubstituted by hydroxy or phenyl; cyclohexyl; phenyl or phenyl monosubstituted by chloro, methyl or methoxy, or
—NR$_5$R$_6$ is a 5- or 6-membered saturated or unsaturated ring containing 1 or 2 hetero atoms, with the provisos that (i) the total number of sulfo groups is 1 or 2 and (ii) $R_1$, $R_2$ or $R_3$ must contain a sulfo group when $K_1$ is a coupling component radical of the aminobenzene series the amino group of which is substituted by an alkylene radical having a terminal sulfo or sulfato group, by a bridge member-containing alkylene radical having a terminal sulfo or sulfato group or by a phenylalkyl group the phenyl group of which has a sulfo substituent, are useful for dyeing or printing anionically dyeable substrates such as natural or synthetic polyamides, especially nylon carpet.

20 Claims, No Drawings

MONO- AND DI-SULFO GROUP CONTAINING COMPOUND HAVING A SUBSTITUTED PYRAZOLYL DIAZO COMPONENT RADICAL AND THEIR USE

The invention relates to anionic monoazo compounds containing a heterocyclic diazo component which compounds are suitable for use as dyestuffs.

According to the invention there is provided monoazo compounds of formula I

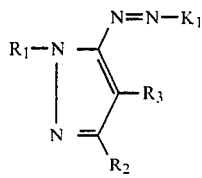

in free acid or salt form,
in which
$R_1$ is $C_{1-6}$alkyl unsubstituted or substituted by one or two groups selected from chlorine, cyano, hydroxy, $C_{1-4}$alkoxy and phenyl which phenyl is unsubstituted or substituted by one or two groups selected from chlorine, $C_{1-4}$alkyl, $C_{1-4}$alkoxy, COOH, $SO_3H$, $SO_2NH_2$ and $NHCOCH_3$; $C_{5-7}$cycloalkyl unsubstituted or substituted by one to three $C_{1-4}$alkyl groups; unsubstituted phenyl or phenyl substituted by one to three groups selected from chlorine, $C_{1-4}$alkyl, $C_{1-4}$alkoxy, $NHCOCH_3$, COOH, $SO_3H$ and $SO_2NR_7R_8$ (only one of each of the latter four groups); or a 1- or 2-naphthyl group which is unsubstituted or substituted by $SO_3H$, $R_2$ is hydrogen, $C_{1-4}$alkyl which is unsubstituted or monosubstituted by hydroxy, chlorine, cyano, $C_{1-4}$alkoxy or phenyl which phenyl is unsubstituted or substituted by one or two groups selected from chlorine, methyl, methoxy, $SO_3H$ and $SO_2NHd\ 2$; $C_{1-4}$alkoxy, cyano, phenyl or phenoxy, the phenyl group of the latter two groups being unsubstituted or monosubstituted by chlorine, methyl, methoxy or $SO_3H$, $R_3$ is CN, $CONH_2$, $COOR_4$, $SO_3H$ or $SO_2NR_5R_6$,
$R_4$ is hydrogen, $C_{1-4}$alkyl, phenyl or phenyl($C_{1-4}$alkyl),
each of $R_5$ and $R_6$, independently, is hydrogen, $C_{1-4}$alkyl, $C_{1-4}$alkyl monosubstituted by hydroxy or phenyl; cyclohexyl, unsubstituted phenyl or phenyl monosubstituted by chlorine, methyl or methoxy, or $R_5$ and $R_6$, together with the N-atom to which they are attached, form a 5- or 6-membered saturated or unsaturated ring which contains one or two hetero atoms,
each of $R_7$ and $R_8$ independently has one of the non-cyclic or cyclic significances of $R_5$ and $R_6$;
$K_1$ is the radical of a coupling component;
with the provisos that:
 (i) in a compound of formula I the total number of sulphonic acid groups is one or two; and
 (ii) the pyrazole diazo component radical must contain a sulphonic acid group when $K_1$ is the radical of a coupling component of the aminobenzene series in which the amine group is substituted by an alkylene or a bridge member containing alkylene group which alkylene groups bear a terminal sulpho or sulphato group, or by a phenylalkyl group the phenyl group of which contains a sulphonic acid group.

Preferably, in a compound of formula I there is a single sulphonic acid group. If this single sulphonic acid group is bound to $K_1$ then suitably $K_1$ is the radical of a coupling component which couples in an acid to neutral pH range. However, any coupling reaction in an alkaline medium is also possible, for example, if a pyrazole diazo component containing the single sulphonic acid group is used. In this case $K_1$ can also be the radical of a coupling component of the pyrazolone, acetoacetamide, phenol or naphthol series.

$K_1$ is preferably the radical of an aromatic-heterocyclic or aromatic-carbocyclic coupling component containing an amine group which is free from sulphonic acid groups or contains a single sulphonic acid group and which couples in an acid reaction medium. More preferably, $K_1$ is the radical of a coupling component of the aminopyrazole, indole, tetrahydroquinoline, aminopyridine, aminobenzene or aminonaphthalene series. Especially preferred is $K_1$ as a radical of a coupling component of the aminopyrazole, indole, aminobenzene or aminonaphthalene series.

In the specification any alkyl, alkenyl or alkylene present (capable of being linear or branched) is linear or branched unless indicated otherwise. The alkyl group of any alkoxy group is linear or branched unless indicated to the contrary.

In any hydroxy substituted alkyl or alkylene group which is attached to a nitrogen atom the hydroxy group is bound to a carbon atom other than to the $C_1$-atom.

Any alkyl as $R_1$ preferably contains 1 to 4 carbon atoms, more preferably 1 or 2 carbon atoms; most preferably it is methyl. Any substituted alkyl preferably contains 1 to 4 carbon atoms which is preferably monosubstituted by a group selected from chlorine, cyano, hydroxy, $C_{1-2}$alkoxy and phenyl which phenyl group is unsubstituted or substituted by one or two groups selected from chlorine, methyl, methoxy, $SO_3H$ and $NHCOCH_3$. More preferably the alkyl group is monosubstituted by hydroxy, phenyl or sulphophenyl.

Any cycloalkyl as $R_1$ is preferably cyclohexyl; any substituted cycloalkyl is preferably cyclohexyl which is substituted by one to three methyl groups.

Any substituted phenyl group as $R_1$ is preferably substituted by one or two groups selected from chlorine, methyl, methoxy, $SO_3H$ and $SO_2NHR_{7a}$ in which $R_{7a}$ is hydrogen or $C_{1-4}$alkyl. More preferably the phenyl group is monosubstituted by chlorine or $SO_3H$ and most preferably it is sulphophenyl.

$R_1$ is preferably $R_{1a}$, where $R_{1a}$ is $C_{1-2}$alkyl; $C_{1-4}$alkyl monosubstituted by hydroxy, chlorine, cyano, $C_{1-2}$alkoxy or phenyl which phenyl is unsubstituted or substituted by one or two groups selected from chlorine, methyl, methoxy, $SO_3H$ and $NHCOCH_3$; cyclohexyl; 1- or 2-naphthyl which is unsubstituted or monosubstituted by $SO_3H$; or phenyl which is unsubstituted or substituted by one or two groups selected from chlorine, methyl, methoxy, $SO_3H$ and $SO_2NHR_{7a}$ (only one of each of the latter two groups). More preferably it is $R_{1b}$, where $R_{1b}$ is methyl; $C_{1-4}$alkyl monosubstituted by hydroxy, phenyl or sulphophenyl; or phenyl which is unsubstituted or monosubstituted by chlorine or $SO_3H$. Even more preferably it is $R_{1c}$, where $R_{1c}$ is phenyl, chlorophenyl or sulphophenyl. Most preferably it is $R_{1d}$, where $R_{1d}$ is phenyl or sulphophenyl.

Any alkyl as $R_2$ is preferably a $C_{1-2}$alkyl group, especially a methyl group. Any alkoxy as $R_2$ preferably contains a $C_{1-2}$alkyl group. Any substituted alkyl as $R_2$ is preferably monosubstituted by hydroxy, chlorine, cyano, $C_{1-2}$alkoxy, phenyl or phenyl monosubstituted by chlorine, methyl, methoxy or $SO_3H$. Most preferably the alkyl group is monosubstituted by hydroxy, phenyl or sulphophenyl.

The phenyl group of any phenyl or phenoxy group as $R_2$ is preferably unsubstituted or monosubstituted by $SO_3H$.

$R_2$ is preferably $R_{2a}$, where $R_{2a}$ is hydrogen, $C_{1-2}$alkyl, $C_{1-2}$alkoxy; $C_{1-4}$alkyl monosubstituted by hydroxy, chlorine, cyano, $C_{1-2}$-alkoxy or phenyl which phenyl is unsubstituted or monosubstituted by chlorine, methyl, methoxy or $SO_3H$; cyano; phenyl or phenoxy the phenyl group of the latter two groups being unsubstituted or monosubstituted by $SO_3H$. More preferably it is $R_{2b}$, where $R_{2b}$ is hydrogen, $C_{1-2}$alkyl; or $C_{1-4}$alkyl monosubstituted by hydroxy, phenyl or sulphophenyl. Even more preferably it is $R_{2c}$, where $R_{2c}$ is hydrogen or methyl. Most preferably $R_2$ is hydrogen.

$R_4$ is preferably $R_{4a}$, where $R_{4a}$ is hydrogen, $C_{1-2}$alkyl, phenyl or benzyl; more preferably it is $R_{4b}$, where $R_{4b}$ is hydrogen, methyl, ethyl or benzyl.

Any alkyl as $R_5$ and $R_6$ preferably contains 1 or 2 carbon atoms; any substituted alkyl is preferably hydroxy-$C_{2-3}$alkyl (more preferably hydroxyethyl) or benzyl.

When $R_5$ and $R_6$ together with the N-atom to which they are attached form a heterocyclic ring it is preferably a piperidine, morpholine, piperazine or N-methylpiperazine ring.

$R_5$ and $R_6$ are preferably $R_{5a}$ and $R_{6a}$, where each of $R_{5a}$ and $R_{6a}$, independently, is hydrogen, $C_{1-2}$alkyl, hydroxyethyl, benzyl, cyclohexyl, phenyl or phenyl monosubstituted by chlorine, methyl or methoxy, or $R_{5a}$ and $R_{6a}$ together with the N-atom to which they are attached form a piperidine, morpholine, piperazine or N-methylpiperazine ring. More preferably they are $R_{5b}$ and $R_{6b}$, where one of $R_{5b}$ and $R_{6b}$ is hydrogen and the other is hydrogen, $C_{1-2}$alkyl, benzyl, cyclohexyl or phenyl or $R_{5b}$ and $R_{6b}$ together with the N-atom to which they are attached form a morpholine ring. Even more preferably $R_5$ is $R_{5c}$, where $R_{5c}$ is hydrogen or $C_{1-2}$alkyl and $R_6$ is hydrogen. Most preferably $R_5$ and $R_6$ are both hydrogen.

$R_3$ is preferably $R_{3a}$, where $R_{3a}$ is CN, $SO_3H$, $CONH_2$, $COOR_{4a}$ or $SO_2NR_{5a}R_{6a1}$. More preferably it is $R_{3b}$, where $R_{3b}$ is CN, $SO_3H$, $CONH_2$, $COOR_{4b}$ or $SO_2NR_{5b}R_{6b}$. Even more preferably it is $R_{3c}$, where $R_{3c}$ is CN, $SO_3H$, $CONH_2$ or $SO_2NHR_{5c}$; even more preferably it is $R_{3d}$, where $R_{3d}$ is CN, $SO_3H$ or $CONH_2$. Most preferably it is $R_{3e}$, where $R_{3e}$ is CN or $SO_3H$.

$K_1$ is preferably one of the groups (a) to (g):
(i) group of formula (a)

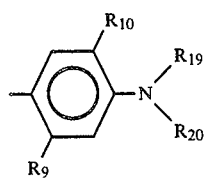

(a)

in which
$R_9$ is hydrogen, chlorine, $C_{1-4}$alkyl, $-NHCOC_{1-4}$alkyl or $-NHCONH_2$, $R_{10}$ is hydrogen, chlorine or $C_{1-4}$alkoxy,
each of $R_{19}$ and $R_{20}$ is independently hydrogen, $C_{1-6}$alkyl unsubstituted or monosubstituted by chlorine, cyano, hydroxy, $C_{1-4}$alkoxy or phenyl which phenyl is unsubstituted or substituted by one or two groups selected from chlorine, $C_{1-4}$alkyl, $C_{1-4}$alkoxy and $SO_3H$; $C_{2-6}$alkenyl; $-(CH_2)_{1-4}-X$; cyclohexyl unsubstituted or substituted by one to three $C_{1-4}$alkyl groups; unsubstituted phenyl or phenyl substituted by one or two groups selected from chlorine, $C_{1-4}$alkyl, $C_{1-4}$alkoxy, $-SO_3H$ and $-SO_2NH_2$; or $R_{19}$ and $R_{20}$, together with the N-atom to which they are attached, form a 5- or 6-membered saturated or unsaturated ring which contains one or two hetero atoms, X is $-OCOR_{21}$, $-COOR_{22}$, $-CONR_{23}R_{24}$, $SO_3H$ or $OSO_3H$, $R_{21}$ is $C_{1-6}$alkyl, phenyl or benzyl, $R_{22}$ is hydrogen, $C_{1-10}$alkyl or benzyl, and each of $R_{23}$ and $R_{24}$ is independently hydrogen, $C_{1-10}$alkyl, cyclohexyl, phenyl or phenyl($C_{1-4}$alkyl) the phenyl group of the latter two groups is unsubstituted or substituted by one or two groups selected from chlorine, $C_{1-4}$alkyl, $C_{1-4}$alkoxy and $SO_3H$, for which group (a) the proviso set forth under (ii) above is pertinent.

$R_9$ is preferably $R_{9a}$, where $R_{9a}$ is hydrogen, methyl, $-NHCOCH_3$ or $-NHCONH_2$. More preferably it is $R_{9b}$, where $R_{9b}$ is hydrogen, methyl or $-NHCOCH_3$.

$R_{10}$ is preferably $R_{10a}$, where $R_{10a}$ is hydrogen, chlorine, methoxy or ethoxy. More preferably it is $R_{10b}$, where $R_{10b}$ is hydrogen, methoxy or ethoxy. Most preferably $R_{10}$ is hydrogen.

$R_{21}$ is preferably $R_{21a}$, where $R_{21a}$ is $C_{1-2}$alkyl or benzyl; more preferably $R_{21}$ is methyl.

$R_{22}$ is preferably $R_{22a}$, where $R_{22a}$ is $C_{1-8}$alkyl; more preferably it is $R_{22b}$, where $R_{22b}$ is $C_{1-4}$alkyl.

$R_{23}$ and $R_{24}$ are preferably $R_{23a}$ and $R_{24a}$, where each of $R_{23a}$ and $R_{24a}$ is independently hydrogen, $C_{1-8}$alkyl, cyclohexyl, phenyl or phenyl($C_{1-2}$alkyl) the phenyl group of the latter two groups is unsubstituted or substituted by one or two groups selected from chlorine, methyl and methoxy. More preferably $R_{23}$ is $R_{23b}$, where $R_{23b}$ is hydrogen or $C_{1-4}$alkyl, and $R_{24}$ is $R_{24b}$, where $R_{24b}$ is $C_{1-8}$alkyl, cyclohexyl, phenyl or phenyl($C_{1-2}$alkyl) the phenyl group of the latter two groups is unsubstituted or substituted by one or two groups selected from chlorine, methyl and methoxy. Most preferably $R_{23}$ is $R_{23c}$, where $R_{23c}$ is hydrogen or $C_{1-2}$alkyl, and $R_{24}$ is $R_{24c}$, where $R_{24c}$ is $C_{1-4}$alkyl or phenyl($C_{1-2}$alkyl).

X is preferably Xa, where Xa is $-OCOR_{21a}$, $-COOR_{22a}$ or $-CONR_{23a}R_{24a}$; more preferably it is Xb, where Xb is $-OCOR_{21a}$, $-COOR_{22a}$ or $-CONR_{23b}R_{24b}$; most preferably it is Xc, where Xc is $-OCOCH_3$, $-COOR_{22b}$ or $-CONR_{23c}R_{24c}$.

Preferably, $R_{19}$ and $R_{20}$ are $R_{19a}$ and $R_{20a}$; where each of $R_{19a}$ and $R_{20a}$ is independently hydrogen, $C_{1-2}$alkyl; $C_{1-4}$alkyl monosubstituted by chlorine, cyano, hydroxy, methoxy or phenyl which phenyl group is unsubstituted or substituted by one or two groups selected from chlorine, methyl, methoxy and $SO_3H$; $C_{2-4}$alkenyl; $-(CH_2)_{1-4}-Xa$; cyclohexyl; phenyl or phenyl substituted by one or two groups selected from chlorine, methyl, methoxy and $SO_3H$; or $R_{19a}$ and $R_{20a}$, together with the N-atom to which they are attached, form a piperidine, morpholine, piperazine or N-methylpiperazine ring. More preferably they are $R_{19b}$ and $R_{20b}$, where each of $R_{19b}$ and $R_{20b}$ is independently hydrogen, $C_{1-2}$alkyl, $C_{1-4}$alkyl monosubstituted by chlorine, cyano, hydroxy or phenyl which phenyl is unsubstituted or substituted by one or two groups selected from chlorine, methyl and methoxy; $C_{2-4}$alkenyl or —$(CH_2)_{1-4}$—Xb. Even more preferably $R_{19}$ is $R_{19c}$, where $R_{19c}$ is hydrogen, $C_{1-2}$alkyl unsubstituted or monosubstituted by hydroxy, chlorine or cyano; or —$(CH_2)_{2-3}$—Xc, and $R_{20}$ is $R_{20c}$, where $R_{20c}$ is $C_{1-2}$alkyl unsubstituted or monosubstituted by hydroxy, chlorine or cyano, or —$(CH_2)_{1-4}$—Xb. Most preferably $R_{19}$ is $R_{19d}$, where $R_{19d}$ is $C_{1-2}$alkyl or hydroxyethyl, and $R_{20}$ is $R_{20d}$, where $R_{20d}$ is $C_{1-2}$alkyl unsubstituted or monosubstituted by hydroxy or cyano; or —$(CH_2)_{2-3}$—Xc.

(ii) group of formula (b)

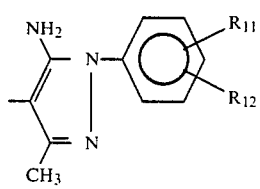

in which
$R_{11}$ is hydrogen, $C_{1-4}$alkyl, $C_{1-4}$alkoxy, chlorine, bromine or $SO_3H$, and
$R_{12}$ is hydrogen, $C_{1-4}$alkyl, $C_{1-4}$alkoxy, chlorine or bromine.

$R_{11}$ is preferably $R_{11a}$, where $R_{11a}$ is hydrogen, methyl, methoxy, chlorine or $SO_3H$. $R_{12}$ is preferably $R_{12a}$, where $R_{12a}$ is hydrogen, methyl, methoxy or chlorine; more preferably $R_{12}$ is hydrogen.

(iii) group of formula (c)

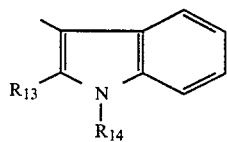

in which
$R_{13}$ is methyl or phenyl, and
$R_{14}$ is hydrogen or $C_{1-4}$alkyl.
More preferably $R_{14}$ is hydrogen.

(iv) group of formula (d)

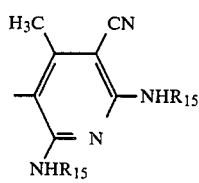

in which
each of $R_{15}$ is independently hydrogen or $C_{1-4}$alkyl which is unsubstituted or monosubstituted by hydroxy, chlorine or cyano.

$R_{15}$ is preferably $R_{15a}$, where each of $R_{15a}$ is hydrogen, $C_{1-2}$alkyl or hydroxyethyl.

(v) groups of formulae ($e_1$) and ($e_2$)

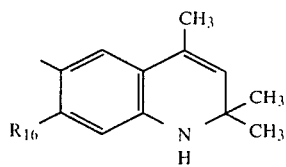

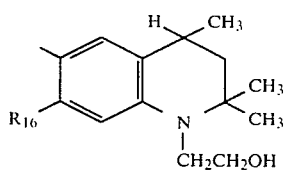

in which
$R_{16}$ is hydrogen, methyl or —$NHCOCH_3$.

(vi) groups of formulae ($f_1$) to ($f_4$)

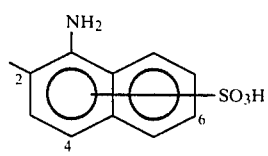

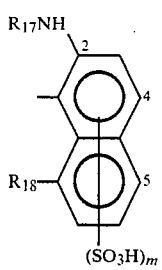

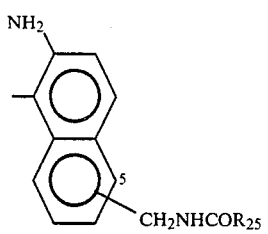

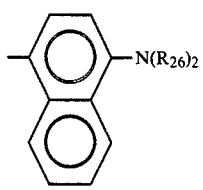

in which
m is 0 or 1,
$R_{17}$ is hydrogen, $C_{1-4}$alkyl unsubstituted or monosubstituted by hydroxy; or phenyl which is unsubstituted or substituted by one to three substituents selected from chlorine, $C_{1-4}$alkyl, $C_{1-4}$alkoxy and $SO_3H$,
$R_{18}$ is hydrogen or hydroxy;
$R_{25}$ is $C_{1-4}$alkyl; $C_{1-4}$alkyl monosubstituted by chlorine, cyano or methoxy; unsubstituted phenyl or phenyl monosubstituted by chlorine, methyl, methoxy, cyano or —$CONH_2$; and each $R_{26}$ is independently hydrogen, $C_{1-4}$alkyl or $C_{1-4}$alkyl monosubstituted by hydroxy, cyano, chlorine or methoxy.

$R_{17}$ is preferably $R_{17a}$, where $R_{17a}$ is hydrogen, $C_{1-2}$alkyl, hydroxy-substituted $C_{2-3}$alkyl, phenyl or phenyl substituted by one or two methyl groups or by one or two methyl groups and $SO_3H$. Most preferably $R_{17}$ is hydrogen and m is 1.

$R_{18}$ is most preferably hydrogen.

$R_{25}$ is preferably $R_{25a}$, where $R_{25a}$ is methyl, $CH_2Cl$, $CH_2CN$ or phenyl; most preferably $R_{25}$ is phenyl.

$R_{26}$ is preferably $R_{26a}$, where each of $R_{26a}$ is independently hydrogen, $C_{1-2}$alkyl, $-CH_2CH_2OH$ or $-CH_2CH_2CN$.

(vii) groups of formulae (g$_1$) to (g$_3$)

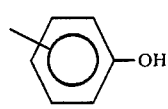

(g$_1$)

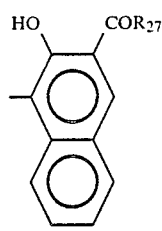

(g$_2$)

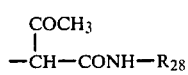

(g$_3$)

in which
$R_{27}$ is hydroxy or phenylamino;
$R_{28}$ is $C_{1-4}$alkyl, phenyl or phenyl($C_{1-4}$alkyl) the phenyl group of the latter two groups is unsubstituted or substituted by one or two groups selected from chlorine, methyl, methoxy and $SO_3H$.

It is preferred that in a group (g$_1$) the hydroxy group may also be etherified for example by alkylation preferably forming a methoxy or ethoxy group.

$R_{28}$ is preferably $R_{28a}$, where $R_{28a}$ is unsubstituted phenyl or phenyl monosubstituted by methyl, methoxy or $SO_3H$.

The groups given under sections (i) to (vi) are derived from coupling components which couple in the preferred acid pH range. The groups given under section (vii) are derived from coupling components which couple in an alkaline reaction medium.

The group (a) is preferably (a$_1$)

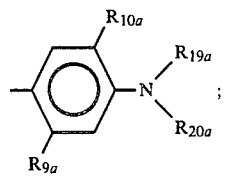

(a$_1$)

more preferably it is (a$_2$), where (a$_2$) is a group (a) in which $R_9$ is $R_{9b}$, $R_{10}$ is $R_{10b}$, $R_{19}$ is $R_{19b}$ and $R_{20}$ is $R_{20b}$. Even more preferably it is (a$_3$), where (a$_3$) is a group (a) in which $R_9$ is $R_{9b}$, $R_{10}$ is $R_{10b}$, $R_{19}$ is $R_{19c}$ and $R_{20}$ is $R_{20c}$. Most preferably it is (a$_4$), where (a$_4$) is a group (a) in which $R_9$ is $R_{9b}$, $R_{10}$ is hydrogen, $R_{19}$ is $R_{19d}$ and $R_{20}$ is $R_{20d}$.

The group (b) is preferably (b$_1$), where (b$_1$) is a group (b) in which $R_{11}$ is $R_{11a}$ and $R_{12}$ is $R_{12a}$. More preferably it is (b$_2$), where (b$_2$) is a group (b) in which $R_{11}$ is $R_{11a}$ and $R_{12}$ is hydrogen.

The group (c) is preferably (c$_1$), where (c$_1$) is a group (c) in which $R_{14}$ is hydrogen.

The group (d) is preferably (d$_1$), where (d$_1$) is a group (d) in which $R_{15}$ is $R_{15a}$ and both $R_{15a}$'s are identical.

The group (f$_1$) is preferably (f$_{1a}$), where (f$_{1a}$) is a group (f$_1$) in which the sulphonic acid group is in the 4-, 6-, 7- or 8-position; more preferably it is in the 4-position.

The group (f$_2$) is preferably (f$_{2a}$) of the formula

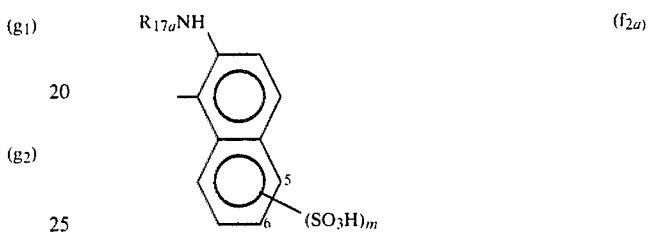

(f$_{2a}$)

in which m is 0 or 1 and the sulpho group is in the 5- or 6-position when m is 1.

More preferably (f$_2$) is a group (f$_{2b}$)

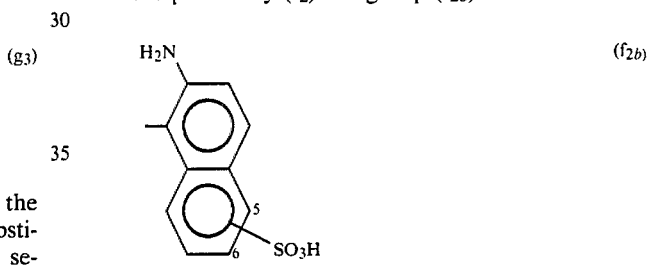

(f$_{2b}$)

in which the sulpho group is bound to the 5- or 6-position.

The group (f$_3$) is preferably (f$_{3a}$), where (f$_{3a}$) is a group (f$_3$) containing the group is $-CH_2NHCOR_{25a}$ in the 5-position; more preferably $R_{25a}$ is phenyl.

$K_1$ is preferably $K_{1a}$, where $K_{1a}$ is a group (a$_1$), (b$_1$), (c), (d$_1$), (f$_{1a}$), (f$_{2a}$) or (f$_{3a}$); more preferably it is $K_{1b}$, where $K_{1b}$ is a group (a$_2$), (b$_1$), (c$_1$), (f$_{1a}$) in which the sulpho group is in the 4-position, (f$_{2a}$) or (f$_{3a}$) in which $R_{25a}$ is phenyl; even more preferably $K_1$ is $K_{1c}$, where $K_{1c}$ is a group (a$_3$), (b$_2$), (c$_1$)or (f$_{2b}$); most preferably $K_1$ is $K_{1d}$, where $K_{1d}$ is a group (a$_4$), (b$_2$), (c$_1$) or (f$_{2b}$).

Preferred compounds correspond to formula Ia,

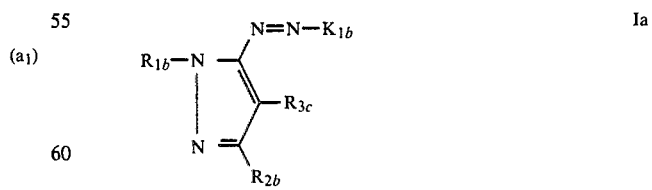

Ia which compounds contain a single sulphonic acid group in free acid or salt form.

Even more preferred are compounds of formula Ia in which
(1) $R_{1b}$ is $R_{1c}$;
(2) $R_{1b}$ is $R_{1d}$;

(3) $R_{3c}$ is $R_{3d}$;
(4) those of (1) to (3) in which $R_{3c}$ is $R_{3c}$;
(5) those of (1) to (4) in which $R_{2b}$ is $R_{2c}$, especially hydrogen;
(6) those of (1) to (5) in which $K_{1b}$ is $K_{1c}$;
(7) those of (1) to (6) in which $K_{1b}$ is $K_{1d}$; and
(8) $R_{2b}$ is $R_{2c}$, especially hydrogen.

When the compound of formula I is in the salt form, the cation of the sulpho group(s) and any carboxy group is not critical and may be any one of those non-chromophoric cations conventional in the field of anionic dyestuffs. Examples of such cations are alkali metal cations and unsubstituted or substituted ammonium cations e.g., lithium, sodium, potassium, ammonium, mono- di-, tri- and tetra-methylammonium and triethylammonium, mono-, di- and tri-ethanolammonium.

The preferred cations are the alkali metal cations and ammonium, with sodium being the most preferred.

In a compound of formula I the cation of the sulpho and carboxy groups can also be a mixture of the above mentioned cations e.g., the compound of formula I can be in a mixed salt form.

Compounds of formula I can be prepared by known methods comprising reacting the diazonium compound of an amine of formula II

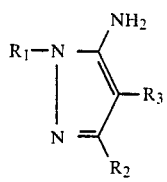
II with a compound of formula III

 III.

Diazotisation and coupling reactions may be effected in accordance with conventional methods. If a diazo component containing a sulpho group is used the conventional diazotisation method using nitrous acid in an aqueous, for example hydrochloric acid containing reaction medium is applied. If a sulpho-free diazo component is used suitably diazotisation is effected using nitrosylsulphuric acid, and the following coupling reaction is preferably carried out in an acid reaction medium.

The starting materials, compounds of formulae II and III, are either known or may be obtained by known processes from available starting materials.

For example, coupling components of the formula

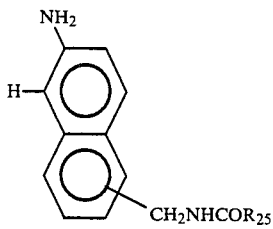

can be obtained by reacting 2-aminonaphthalene-1-sulphonic acid with a compound of formula IV

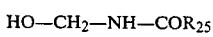 IV in accordance with the method of the Tsherniac-Einhorn reaction. This is a conventional condensation reaction to introduce an amidomethyl group into the naphthyl ring whereby water is eliminated. Subsequently, the sulpho group in the 1-position is split off in accordance with known methods at 100°–160°.

Compounds of formula II can be obtained for example according to the following reaction scheme:
(a) compounds of formula IIa in which $R_3$ is CN

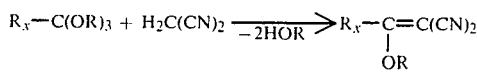

(in which for instance $R_x$ is H or $CH_3$, R is lower alkyl)

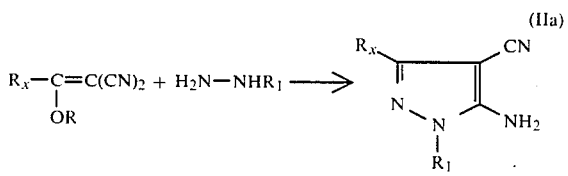
(IIa)

(b) compounds of formula IIb in which $R_2$ is $CH_3$ and $R_3$ is H

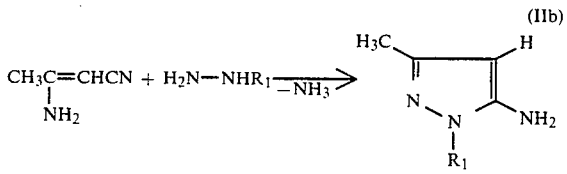
(IIb)

A sulpho group (as $R_3$) can be introduced into a compound of formula IIb in accordance with known methods by reacting with oleum or chlorosulphonic acid in an organic solvent (e.g., ethylene chloride). The sulphonation is selectively in the 4-position.

The sulpho group may be converted into a sulphonamide group by reacting with an excess of chlorosulphonic acid optionally in the presence of thionyl chloride and subsequent treatment with ammonia or an appropriate amine.

The compounds of formula I can be isolated in accordance with conventional methods. Advantageously, the isolation of the monoazo compounds is effected by salting out, subsequent filtering, washing and drying in vacuo. Depending on the reaction and isolation conditions a compound of formula I is obtained in free acid or preferably salt form or even mixed salt forms containing, for example, one or more of the above mentioned cations. It may be converted from free acid form to a salt form or mixture of salt forms or vice versa or from one salt form to another by conventional means.

The compounds of formula I, especially in salt or mixed salt forms, are useful for dyeing and printing substrates dyeable with anionic dyes such as leather, natural or synthetic polyamides, polyurethanes and basic-modified polyolefins. They are especially suitable for dyeing and printing textile substrates consisting of or containing natural or synthetic polyamides, such as wool, silk, and especially nylon, for example nylon 6 or nylon 66. The compounds are particularly suitable for dyeing or printing of nylon carpet and especially of nylon 6 or nylon 66 carpet.

Dyeing and printing may be carried out in accordance with known methods, for example pad dyeing or exhaust dyeing, especially the latter, inasmuch as the compounds of formula I exhaust from an essentially neutral, aqueous dyebath, i.e., from a weakly alkaline to weakly acid, aqeous dyebath. Furthermore, the compounds of formula I are also useful for use in the "space-dyeing" process. The compounds are further suitable for using the displacement technique in carpet dyeing.

The compounds of formula I may be formulated into liquid or solid compositions such as conventionally used for monoazo acid dyes intended for, for example, the dyeing or printing of anionically dyeable substrates such as nylon carpet. The preparation of such compositions in form of stable liquid, for example concentrated aqueous, preparations, or solid preparations may be carried out in accordance with conventional methods, for example by dissolving in suitable solvents, e.g., water, optionally with the addition of conventional additives such as solubilising agents, for example urea, or by grinding or granulating. Such preparations may be obtained from example as described in French Patent Specifications Nos. 1,572,030 and 1,581,900.

Further, the compounds of formula I may be made up into preparations which are dispersible in cold water. Such dispersions may be prepared, for example, by grinding the dye dry or wet in an aqueous dispersing medium in the presence of one or more conventional anionic dispersing agents and optionally in the presence of other conventional additives, optionally with subsequent spray-drying. The preparations so obtained are finely dispersed in cold water.

The compounds of formula I in salt form are well soluble in water. They build-up well and have a rapid strike; they have a good exhaustion behaviour combined with good migrating properties and give even dyeings, especially on nylon which tends to give stripy dyeings. The dyeings obtained on, for example, nylon possess notably good fastness to light. Furthermore, the compounds of formula I give dyeings which show good all-around fastness properties, such as wet-fastness properties, especially fastness to washing, (cold) water, milling and perspiration and other fastness properties, such as dry and wet fastness to crocking and fastness to ozone. It is further to be mentioned that the compounds of formula I have good resistance to formaldehyde; this property is particularly important in dyeing or printing carpet. Furthermore, the dyeings or prints on natural or synthetic polyamides show good behaviour with respect to thermotropy or phototropy effects.

The compounds of formula I are suitable for combining with each other or with other conventionally known anionic dyes which exhaust from a neutral to weakly acid dyebath and are particularly useful for combining in important ternary dye mixtures, whereby tone-in-tone dyeings having the above-mentioned advantageous properties are obtained. Further, such dyeings do not exhibit catalytic fading.

Suitable dyestuffs for a binary mixture to give a green tone are, for example, C.I. Acid Blue 40 and C.I. Acid Blue 324.

Suitable dyestuffs for a ternary mixture (trichromy) consisting of a yellow, red and blue dyestuff component for example are as follows:

yellow component:
 any yellow dyestuff described in this Specification; furthermore, C.I. Acid Yellow 49, C.I. Acid Yellow 219 and C.I. Acid Orange 156;

red component:
 any red dyestuff described in this Specification; furthermore, C.I. Acid Red 57, C.I. Acid Red 266 and C.I. Acid Red 361;

blue component:
 C.I. Acid Blue 40, C.I. Acid Blue 277, C.I. Acid Blue 288, C.I.
 Acid Blue 324 and C.I. Acid Blue 342.

The following Examples further serve to illustrate the invention. In the Examples, all parts and percentages are by weight and all temperatures are in degrees centigrade.

EXAMPLE 1

28.6 Parts of 1-phenyl-4-cyano-5-aminopyrazole-4'-sulphonic acid in form of the sodium salt are dissolved in 300 parts of water at 25°. A pH of 0.2 is obtained by the addition of 18 parts of hydrochloric acid (30%) and 100 parts ice. The temperature of the solution is 2°–3°. Diazotisation is effected in accordance with known method using a 4N sodium nitrite solution. After three hours the resulting diazo suspension is added dropwise to a solution of 17 parts of 1-phenyl-3-methyl-5-aminopyrazole in 50 parts of glacial acetic acid within 30 minutes. The coupling mixture is stirred for further ten hours whereby the temperature is allowed to rise to 20° to 25°. Subsequently, the pH of the suspension is adjusted to ca. 7.5 by the addition of 15 parts of a 30% sodium hydroxide solution. 20 Parts of sodium chloride are sprinkled into the suspension. After a one hour stirring a dyestuff precipitates in crystalline form. It is filtered, washed with a 5% sodium chloride solution, dried and ground. The obtained dyestuff, which in free acid form corresponds to the formula

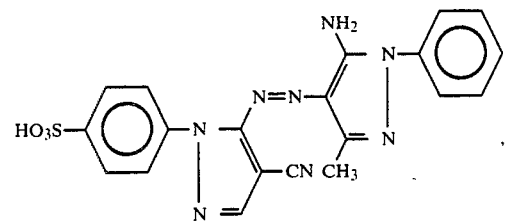

dyes polyamide fibres a yellow shade. For dyeing and printing the conventional exhaust, continuous dyeing and printing processes can be used. The dyeings on polyamide show good fastness properties, particularly good light fastness properties.

EXAMPLE 2

To a mixture of 68 parts of 85% phosphoric acid and 40 parts of glacial acetic acid 18.4 parts of 1-phenyl-4-cyano-5-aminopyrazole are added and dissolved. 35 Parts of nitrosylsulphuric acid are added dropwise at 0°–2°, and the resulting mixture is stirred for two hours at this temperature. Subsequently, any excess nitrous acid is decomposed by the addition of urea. 23 Parts of 2-aminonaphthalene-6-sulphonic acid are dissolved in 300 parts water with the addition of 14 parts of a 30% sodium hydroxide solution. To this solution 13 parts of hydrochloric acid (30%) and 300 parts ice are added. Then the above obtained diazo mixture is added at 0°–5°, while keeping the pH of the coupling mixture at 2.5 to 3.0 by the addition of an appropriate amount of a 50% sodium acetate solution. After coupling is completed the pH of the reaction mixture is adjusted to 7 to 8 by the addition of sodium hydroxide solution. The dyestuff which precipitates is filtered by suction, washed with a dilute sodium chloride solution and dried. It corresponds to the formula (in free acid form),

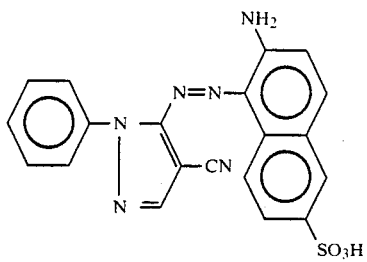

and dyes natural or synthetic polyamide fibres a red shade. The dyeings have good light and wet fastness properties.

EXAMPLE 3

To a mixture consisting of 680 parts water, 216 parts of phenylhydrazine and 164 parts of 2-chloroacrylonitrile 220 parts of a 30% sodium hydroxide solution are added dropwise at room temperature. After six hours the reaction is completed. The resulting 1-phenyl-5-aminopyrazole is isolated from that phase which has been separated by the addition of sodium chloride.

80 Parts of 1-phenyl-5-aminopyrazole are dissolved in 250 parts of ethylene chloride. To this solution 61.2 parts of chlorosulphonic acid (excess of 5%) are added quickly without cooling whereby the temperature rises to 60°. At the beginning an emulsion the reaction mixture solidifies to a suspension which is stirred for one further hour and then filtered. The filter residue is washed with a small amount of acetone.

The obtained 1-phenyl-5-aminopyrazole-4-sulphonic acid is diazotised in conventional manner. The diazo solution is added to a mixture consisting of 24.8 parts of the amine having the formula

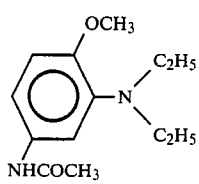

dissolved in 200 parts of methanol and 100 parts of water the pH of which mixture has been adjusted to 4–5 by the addition of 30% hydrochloric acid. During the addition the pH of the coupling mixture is kept at 4–5 by the addition of sodium acetate. At the end of coupling the mixture is salted out using 200 g of sodium chloride (=20 volume %), and the precipitate is filtered and dried. A compound corresponding to the formula

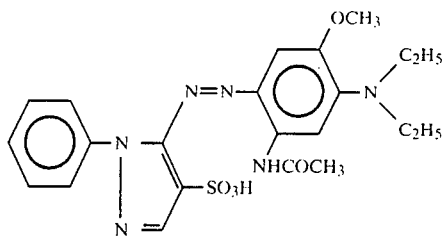

is obtained which dyes natural and synthetic polyamide fibres a red shade. The dyeings on polyamide show high levelness and have good light and wet fastness properties.

EXAMPLE 4

To a mixture consisting of 80 parts of a 85% phosphoric acid solution and 33 parts of a 40% nitrosylsulphuric acid solution 28.6 parts of 1-phenyl-4-cyano-5-aminopyrazole-3'-sulphonic acid in form of the sodium salt are added within one hour at 0°–3°. Stirring is effected for a further one hour at a temperature of max. 3°. Any excess of nitrous acid is then decomposed by the addition of urea. 13.1 Parts of 2-methylindole dissolved in 120 parts of ethanol are added. The mixture is stirred for four hours at 0°–5°. After coupling is completed 200 parts of ice and 100 parts of a 30% sodium hydroxide solution are added to the suspension. The product which precipitates is separated by filtration. A dyestuff corresponding to the formula

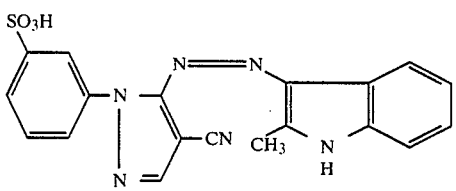

is obtained which dyes natural and synthetic polyamide fibres a golden-yellow shade. The dyeings have good wet fastness properties and a very good light fastness.

The dyestuffs of Examples 1 to 4 are well suited as components for trichromy; they are well combinable with each other and form, as individual or mixed dyes, together with the above mentioned yellow, red and/or blue components trichromies which have very good dyeing properties.

EXAMPLES 5 TO 30

By a method analogous to that of Examples 1 and 4 further monoazo compounds can be prepared from appropriate starting compounds. They correspond to formula (1)

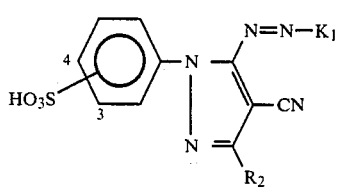

(1)

in which the symbols are defined in Table 1 below. In the last column of this Table 1 and also of all the following Tables 2 to 5 the shade of the dyeing on polyamide is given whereby a is greenish-yellow
b is yellow
c is golden-yellow
d is orange
f is red
g is bluish-red
h is purple and
i is violet.

-continued e is yellowish-red

Using the conventional exhaust or continuous dyeing or printing processes natural or synthetic polyamide fabric can be dyed with the compounds of the Examples listed in the Tables 1 to 5. The resulting dyeings and prints show good light and wet fastness properties.

TABLE 1

Compounds of formula (1)

| Ex. No. | position of $SO_3H$ | $R_2$ | $K_1$ | shade on PA |
|---|---|---|---|---|
| 5 | 4 | H | 2-methylindole | c |
| 6 | 4 | $CH_3$ | 2-methylindole | c |
| 7 | 3 | $CH_3$ | 2-methylindole | c |
| 8 | 3 | $CH_3$ | 1-phenyl-3-methyl-5-aminopyrazole | a |
| 9 | 3 | H | 1-phenyl-3-methyl-5-aminopyrazole | a |
| 10 | 4 | $CH_3$ | 1-phenyl-3-methyl-5-aminopyrazole | a |
| 11 | 4 | H | 2-phenylindole | c |

TABLE 1-continued
Compounds of formula (1)
| Ex. No. | position of SO$_3$H | R$_2$ | K$_1$ | shade on PA |
|---|---|---|---|---|
| 12 | 4 | H | 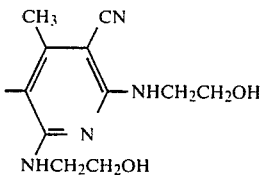 | b |
| 13 | 4 | CH$_3$ | 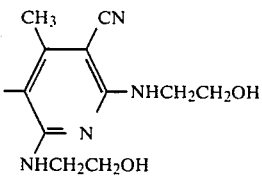 | b |
| 14 | 4 | CH$_3$ | 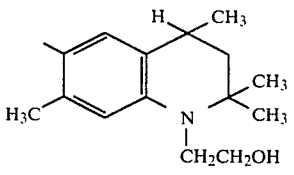 | f |
| 15 | 4 | CH$_3$ | 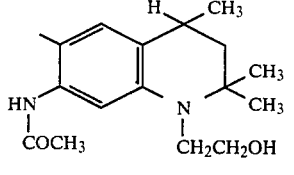 | g |
| 16 | 4 | H | 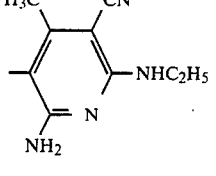 | b |
| 17 | 3 | H | 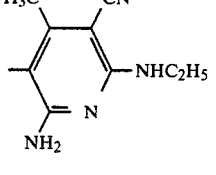 | b |
| 18 | 4 | H | 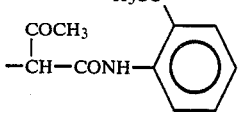 | a |
| 19 | 3 | H | 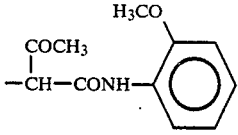 | a |
| 20 | 3 | CH$_3$ | 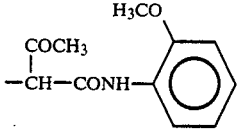 | a |

TABLE 1-continued

Compounds of formula (1)

| Ex. No. | position of SO₃H | R₂ | K₁ | shade on PA |
|---|---|---|---|---|
| 21 | 3 | CH₃ | 3-methyl-2-(phenylamino)naphthalene | i |
| 22 | 3 | H | 3-methyl-2-(phenylamino)naphthalene | i |
| 23 | 4 | H | 3-methyl-2-[(2,6-dimethylphenyl)amino]naphthalene | e |
| 24 | 4 | CH₃ | 3-hydroxy-4-methyl-2-naphthalenecarboxylic acid | d |
| 25 | 4 | H | 3-hydroxy-4-methyl-2-naphthalenecarboxylic acid | d |
| 26 | 4 | H | 6-amino-5-methyl-1-(acetamidomethyl)naphthalene (H₂N—, CH₂NHCO—CH₃) | f |

TABLE 1-continued

Compounds of formula (1)

| Ex. No. | position of SO$_3$H | R$_2$ | K$_1$ | shade on PA |
|---|---|---|---|---|
| 27 | 4 | CH$_3$ | 4-methyl-6-amino-naphthalen-1-yl with CH$_2$NHCOCH$_3$ substituent | f |
| 28 | 4 | CH$_3$ | 4-methyl-6-amino-naphthalen-1-yl with CH$_2$NHCO-phenyl substituent | f |
| 29 | 4 | H | 4-methyl-6-amino-naphthalen-1-yl with CH$_2$NHCO-phenyl substituent | f |
| 30 | 3 | H | 4-methyl-6-amino-naphthalen-1-yl with CH$_2$NHCO-phenyl substituent | f |

EXAMPLES 31 TO 64

By a method analogous to that of Examples 1, 2 and 4 further monoazo compounds can be prepared from appropriate starting compounds. They correspond to formula (2)

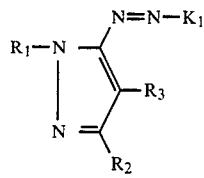

(2)

in which the symbols are as defined in Table 2 below.

TABLE 2

Compounds of formula (2)

| Ex. No. | R$_1$ | R$_2$ | R$_3$ | K$_1$ | shade on PA |
|---|---|---|---|---|---|
| 31 | 3-SO$_3$H-phenyl | H | CONH$_2$ | 5-amino-3-methyl-1-phenylpyrazol-4-yl (NH$_2$, CH$_3$, N-phenyl pyrazole) | a |
| 32 | " | CH$_3$ | " | " | a |

TABLE 2-continued

Compounds of formula (2)

| Ex. No. | R₁ | R₂ | R₃ | K₁ | shade on PA |
|---|---|---|---|---|---|
| 33 | phenyl | H | " | 5-amino-4-methyl-pyrazolyl-N=N-C₆H₄-SO₃H | a |
| 34 | " | " | CN | " | a |
| 35 | 4-Cl-phenyl | CH₃ | " | " | a |
| 36 | CH₃ | H | " | " | a |
| 37 | " | phenyl | " | " | a |
| 38 | phenyl | CH₃ | " | 1-methyl-2-amino-6-sulfo-naphthyl | f |
| 39 | " | H | CONH₂ | " | f |
| 40 | " | " | SO₂NH₂ | " | e |
| 41 | CH₃ | " | CN | " | d |
| 42 | " | CH₃ | " | " | d |
| 43 | 4-Cl-phenyl | " | " | " | f |
| 44 | " | H | " | " | f |
| 45 | phenyl | " | " | 1-methyl-2-amino-5-sulfo-naphthyl | f |
| 46 | " | CH₃ | " | " | f |
| 47 | " | " | CONH₂ | " | f |
| 48 | " | H | " | " | f |
| 49 | benzyl | " | CN | " | d |
| 50 | CH₃ | CH₃ | " | " | d |

TABLE 2-continued

Compounds of formula (2)

| Ex. No. | R₁ | R₂ | R₃ | K₁ | shade on PA |
|---------|----|----|----|----|-------------|
| 51 | phenyl | " | " | naphthalene with NHCH₂CHCH₃ (with OH on CH), CH₃, SO₃H | g |
| 52 | " | H | " | naphthalene with NHCH₃, CH₃, SO₃H | g |
| 53 | " | " | " | naphthalene with NHCH₃, CH₃, HO, SO₃H | i |
| 54 | " | CH₃ | " | naphthalene with NH-(2,6-dimethylphenyl), CH₃, HO, SO₃H | i |
| 55 | " | H | " | naphthalene with NH-(2,6-dimethylphenyl), CH₃, HO, SO₃H | i |

TABLE 2-continued

Compounds of formula (2)

| Ex. No. | R₁ | R₂ | R₃ | K₁ | shade on PA |
|---|---|---|---|---|---|
| 56 | " | " | " | 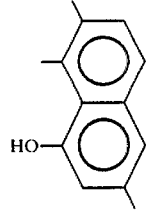 | i |
| 57 | " | " | CONH₂ | " | i |
| 58 | 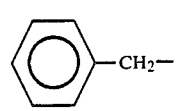 | " | CN | " | d |
| 59 |  | " | " | 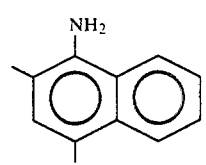 | i |
| 60 | " | CH₃ | " | " | i |
| 61 | " | H | CONH₂ | " | i |
| 62 | 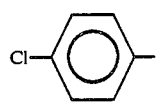 | " | CN | " | h |
| 63 | CH₃ | " | " | " | h |
| 64 | " | " | CONH₂ | 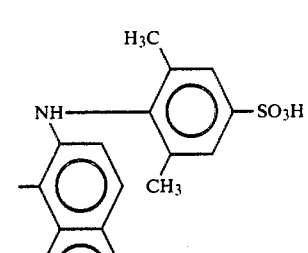 | e |

EXAMPLES 65 TO 85

By a method analogous to that of Examples 1 and 3 further compounds of formula I can be prepared from appropriate starting compounds. They correspond to formula (3)

(3)

in which the symbols are defined in Table 3 below.

TABLE 3

Compounds of formula (3)

| Ex. No. | R₂ | K₁ | shade on PA |
|---|---|---|---|
| 65 | H | 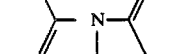 | a |

TABLE 3-continued

Compounds of formula (3)

| Ex. No. | R₂ | K₁ | shade on PA |
|---|---|---|---|
| 66 | CH₃ | 3-methyl-2-hydroxy-naphthalene-carboxylic acid (HO, COOH on naphthalene) | d |
| 67 | H | 6-amino-5-methyl-naphthalene with CH₂NHCOCH₃ | d |
| 68 | " | 6-amino-5-methyl-naphthalene with CH₂NHCOC₆H₅ | d |
| 69 | " | 3-methyl-2-(phenylamino)naphthalene (NH-phenyl) | h |
| 70 | CH₃ | " | g |
| 71 | H | 2,2,4,6-tetramethyl-1,2-dihydroquinoline | f |
| 72 | CH₃ | " | f |
| 73 | H | 7-acetamido-2,2,4,6-tetramethyl-1,2-dihydroquinoline (CH₃CONH-) | f |
| 74 | CH₃ | " | f |
| 75 | " | 2,2,4-trimethyl-6,7-dimethyl-1,2-dihydroquinoline | f |
| 76 | H | 4-ethylamino-1-methylnaphthalene (NHC₂H₅) | g |
| 77 | CH₃ | 3-methyl-2-hydroxy-N-phenyl-naphthamide (OH, CONH-Ph) | f |
| 78 | " | —CH(COCH₃)—CONH-(2-methoxyphenyl) | a |
| 79 | H | " | a |
| 80 | CH₃ | 4-methylphenol (OH) | b |
| 81 | " | 4-methylanisole (OCH₃) | b |
| 82 | " | 6-amino-5-methyl-naphthalene with CH₂NHCOCH₂Cl | d |
| 83 | " | 4-amino-5-methyl-naphthalene-sulfonic acid (NH₂, SO₃H) | f |

TABLE 3-continued

| | Compounds of formula (3) | | shade on PA |
|---|---|---|---|
| Ex. No. | $R_2$ | $K_1$ | |
| 84 | " | 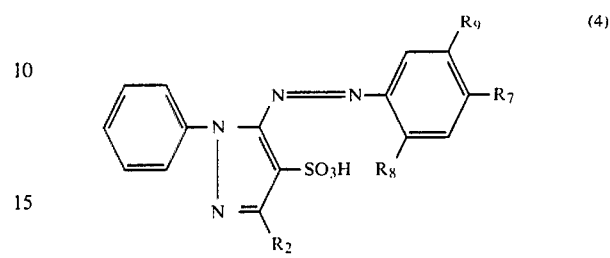 | f |
| 85 | H | " | f |

EXAMPLES 86 TO 113

By a method analogous to that of Example 3 further compounds of formula I can be prepared from appropriate starting compounds. They correspond to formula (4)

$$\text{(4)}$$

in which the symbols are as defined in Table 4 below.

TABLE 4

| | Compounds of formula (4) | | | | |
|---|---|---|---|---|---|
| Ex. No. | $R_2$ | $R_7$ | $R_8$ | $R_9$ | shade on PA |
| 86 | H | $-N(C_2H_5)_2$ | $-NHCOCH_3$ | $OC_2H_5$ | f |
| 87 | $CH_3$ | $-N(C_2H_5)_2$ | $-NHCOCH_3$ | $OC_2H_5$ | f |
| 88 | $CH_3$ | $-N(C_2H_5)_2$ | $-NHCOCH_3$ | H | e |
| 89 | H | $-N(C_2H_5)_2$ | $-NHCOCH_3$ | H | e |
| 90 | $CH_3$ | $-N(C_2H_5)_2$ | H | H | d |
| 91 | H | $-N(C_2H_5)(C_2H_4OH)$ | H | H | d |
| 92 | H | $-N(C_2H_4OCOCH_3)_2$ | $-NHCOCH_3$ | $OC_2H_5$ | f |
| 93 | $CH_3$ | $-N(C_2H_4OCOCH_3)_2$ | $-NHCOCH_3$ | $OC_2H_5$ | f |
| 94 | $CH_3$ | $-N(C_2H_4OCOCH_3)_2$ | H | H | d |
| 95 | H | $-N(C_2H_4OH)_2$ | $-NHCOCH_3$ | $OC_2H_5$ | g |
| 96 | $CH_3$ | $-N(C_2H_4OH)_2$ | $-NHCOCH_3$ | $OC_2H_5$ | f |
| 97 | H | $-N(C_2H_5)(C_2H_4COOC_2H_5)$ | $-NHCOCH_3$ | $OC_2H_5$ | f |
| 98 | $CH_3$ | $-N(C_2H_5)(C_2H_4COOC_2H_5)$ | $-NHCOCH_3$ | $OC_2H_5$ | f |
| 99 | H | $-N(H)(C_2H_4COOC_2H_5)$ | $-NHCOCH_3$ | $OC_2H_5$ | e |
| 100 | $CH_3$ | $-N(H)(C_2H_4COOC_2H_5)$ | $-NHCOCH_3$ | $OC_2H_5$ | e |
| 101 | H | $-N(C_2H_5)(C_2H_4COOC_4H_9(n))$ | $-NHCOCH_3$ | $OC_2H_5$ | f |
| 102 | H | $-N(CH_2CH=CH_2)_2$ | $-NHCOCH_3$ | $OC_2H_5$ | f |
| 103 | H | $-N(CH_2CH=CH_2)_2$ | $-NHCOCH_3$ | $OCH_3$ | f |
| 104 | H | $-N(H)(C_2H_4COOC_4H_9(n))$ | $-NHCOCH_3$ | $OC_2H_5$ | f |

TABLE 4-continued

| Ex. No. | R₂ | R₇ | R₈ | R₉ | shade on PA |
|---|---|---|---|---|---|
| 105 | CH₃ | −N(H)(C₂H₄COOC₄H₉(n)) | −NHCOCH₃ | OC₂H₅ | e |
| 106 | H | −N(H)(C₂H₄COOCH₂CHC₂H₅·C₄H₉(n)) | −NHCOCH₃ | OC₂H₅ | f |
| 107 | CH₃ | −N(H)(C₂H₄COOCH₂CHC₂H₅·C₄H₉(n)) | H | H | e |
| 108 | CH₃ | −N(C₂H₄OH)(C₂H₄CN) | −NHCOCH₃ | H | d |
| 109 | CH₃ | −N(C₂H₅)(C₂H₄OH) | H | H | d |
| 110 | CH₃ | −N(C₂H₅)(C₂H₄OH) | CH₃ | H | d |
| 111 | H | −N(C₂H₅)(C₂H₄OH) | CH₃ | H | d |
| 112 | CH₃ | −N(C₂H₅)(CH₂−C₆H₅) | CH₃ | H | d |
| 113 | CH₃ | −N(C₂H₅)(CH₂−C₆H₅) | H | H | d |
| 114 | H | −N(C₂H₅)(CH₂−C₆H₅) | H | H | d |
| 115 | CH₃ | −N(C₂H₅)(C₂H₄CN) | CH₃ | H | d |
| 116 | CH₃ | −N(C₂H₅)(C₂H₄CN) | H | H | c |

TABLE 4-continued

Compounds of formula (4)

| Ex. No. | $R_2$ | $R_7$ | $R_8$ | $R_9$ | shade on PA |
|---|---|---|---|---|---|
| 117 | H | —N(C$_2$H$_5$)(C$_2$H$_4$CN) | H | H | c |
| 118 | CH$_3$ | —N(C$_2$H$_4$OH)$_2$ | H | H | d |
| 119 | H | —N(C$_2$H$_4$OH)$_2$ | —NHCOCH$_3$ | OCH$_3$ | f |
| 120 | CH$_3$ | —N(C$_2$H$_5$)$_2$ | —NHCOCH$_3$ | Cl | d |
| 121 | CH$_3$ | —N(C$_2$H$_5$)$_2$ | —NHCOCH$_3$ | OCH$_3$ | f |
| 122 | H | —N(H)(CH(C$_2$H$_4$CONC$_2$H$_5$)(CH$_2$C$_6$H$_5$)) | H | H | d |
| 123 | H | —N(H)(CH(C$_2$H$_4$CONC$_2$H$_5$)(CH$_2$C$_6$H$_5$)) | CH$_3$ | H | d |
| 124 | CH$_3$ | —N(H)(CH(C$_2$H$_4$CONC$_2$H$_5$)(CH$_2$C$_6$H$_5$)) | H | H | d |
| 125 | H | —N(H)(CH(C$_2$H$_4$CONC$_2$H$_5$)(CH$_2$C$_6$H$_5$)) | —NHCOCH$_3$ | OC$_2$H$_5$ | f |
| 126 | H | —N(C$_2$H$_5$)(C$_2$H$_4$CON(C$_2$H$_5$)$_2$) | H | H | d |
| 127 | H | —N(C$_2$H$_5$)(C$_2$H$_4$CON(C$_2$H$_5$)$_2$) | CH$_3$ | H | d |
| 128 | CH$_3$ | —N(C$_2$H$_5$)(C$_2$H$_4$CON(C$_2$H$_5$)$_2$) | H | H | d |
| 129 | H | —N(C$_2$H$_5$)(C$_2$H$_4$CON(C$_2$H$_5$)$_2$) | —NHCOCH$_3$ | OCH$_3$ | f |

TABLE 4-continued

| | | Compounds of formula (4) | | | |
|---|---|---|---|---|---|
| Ex. No. | $R_2$ | $R_7$ | $R_8$ | $R_9$ | shade on PA |
| 130 | H | —N(C$_2$H$_5$)(C$_2$H$_4$CON(C$_4$H$_9$(n))C$_4$H$_9$(n)) | H | H | d |
| 131 | H | —N[C$_2$H$_4$CON(C$_2$H$_5$)$_2$]$_2$ | H | H | d |
| 132 | H | —N[C$_2$H$_4$CON(C$_2$H$_5$)$_2$]$_2$ | CH$_3$ | H | d |
| 133 | H | —N(C$_2$H$_5$)(C$_2$H$_4$CONHCH$_2$CHC$_2$H$_5$(C$_4$H$_9$(n))) | CH$_3$ | H | d |

EXAMPLES 134 TO 169

By a method analogous to that of Examples 1 and 4 further compounds of formula I can be prepared from appropriate starting compounds. They correspond to formula (5)

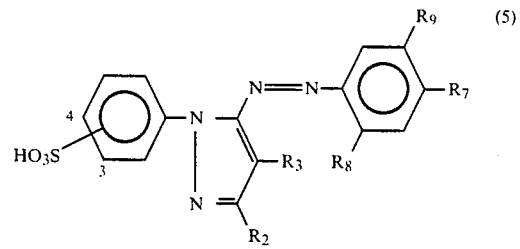

in which the symbols are defined in Table 5 below.

TABLE 5

| | | | Compounds of formula (5) | | | |
|---|---|---|---|---|---|---|
| Ex. No. | position of SO$_3$H | $R_2$ | $R_3$ | $R_7$ | $R_8$ | $R_9$ | shade on PA |
| 134 | 4 | H | CN | —N(CH$_2$CH$_2$OCOCH$_3$)$_2$ | H | H | f |
| 135 | 4 | " | CN | —N(C$_2$H$_5$)(CH$_2$CH$_2$CN) | " | " | f |
| 136 | 3 | " | CN | " | " | " | f |
| 137 | 3 | CH$_3$ | CN | " | " | " | f |
| 138 | 4 | H | CN | " | CH$_3$ | " | f |
| 139 | 3 | CH$_3$ | CN | " | " | " | f |
| 140 | 4 | " | CN | " | " | " | f |
| 141 | 4 | " | CONH$_2$ | " | " | " | e |
| 142 | 4 | H | CN | —N(CH$_2$CH$_2$CN)(CH$_2$CH$_2$OH) | —NHCOCH$_3$ | " | f |
| 143 | 3 | " | CN | " | " | " | f |
| 144 | 4 | " | CN | —N(CH$_2$CH$_2$OH)$_2$ | H | " | f |
| 145 | 3 | CH$_3$ | CONH$_2$ | " | " | " | e |
| 146 | 4 | " | CN | " | " | " | f |
| 147 | 4 | H | CN | —N(C$_2$H$_5$)(CH$_2$—C$_6$H$_5$) | " | " | f |
| 148 | 3 | CH$_3$ | CN | " | " | " | f |
| 149 | 4 | H | CN | " | CH$_3$ | " | g |

TABLE 5-continued

| Ex. No. | position of SO$_3$H | R$_2$ | R$_3$ | R$_7$ | R$_8$ | R$_9$ | shade on PA |
|---|---|---|---|---|---|---|---|
| 150 | 4 | " | CN | $-N\begin{matrix}C_2H_5\\CH_2CH_2OH\end{matrix}$ | H | " | f |
| 151 | 3 | " | CN | " | " | " | f |
| 152 | 4 | " | CN | " | CH$_3$ | " | g |
| 153 | 4 | " | CONH$_2$ | " | " | " | g |
| 154 | 4 | CH$_3$ | CN | " | " | " | g |
| 155 | 3 | H | CN | " | " | " | f |
| 156 | 3 | CH$_3$ | CN | " | " | " | g |
| 157 | 4 | H | CN | " | —NHCOCH$_3$ | OCH$_3$ | f |
| 158 | 4 | " | CN | $-N\begin{matrix}CH_3\\CH_2CH_2OH\end{matrix}$ | " | H | f |
| 159 | 4 | CH$_3$ | CN | " | " | " | f |
| 160 | 4 | H | CN | —N(C$_2$H$_5$)$_2$ | H | " | f |
| 161 | 4 | " | CN | " | —NHCOCH$_3$ | " | f |
| 162 | 4 | " | CN | " | " | OC$_2$H$_5$ | h |
| 163 | 4 | " | CONH$_2$ | " | " | " | f |
| 164 | 4 | CH$_3$ | CN | " | " | " | g |
| 165 | 3 | H | CN | " | " | " | h |
| 166 | 3 | CH$_3$ | CN | " | " | " | h |
| 167 | 3 | H | CN | " | " | OCH$_3$ | h |
| 168 | 3 | " | CN | " | CH$_3$ | H | g |
| 169 | 4 | " | CONH$_2$ | " | " | " | f |

In accordance with the reaction and isolation conditions as described the dyestuffs of Examples 1 to 169 are obtained in the sodium salt form. They may, depending on the reaction and isolation conditions, or by reacting the sodium salts in accordance with known mehods also be obtained in free acid form or in other salt forms, for example those salt forms containing one or more cations indicated in the description.

In the following examples the application of the compounds of this invention is illustrated.

APPLICATION EXAMPLE A (Exhaust dyeing of polyamide fabric)

100 Parts of pre-wetted synthetic polyamide, for example nylon 66, are entered at 40° into a dyebath consisting of:
2 parts of the dyestuff of Example 1, 2, 3 or 4,
10 parts of anhydrous sodium sulphate and
4000 parts of water.

The dye liquor is heated over the course of 30 minutes to boiling temperature and kept at this temperature for one hour. 4 Parts of glacial acetic acid are then added thereto and dyeing is completed with heating for a further 30 minutes at boiling temperature. The water that evaporates during dyeing is continuously replaced. The dyed nylon cloth showing a yellow shade (for the dyestuff of Example 1; a red shade for Examples 2 and 3, and a golden-yellow shade for Example 4) is then removed from the liquor, rinsed with water and dried. Wool may also be dyed by the same process.

Similarly, the dyestuffs of Examples 5 to 169 or mixtures of two or more of the dyestuffs of Examples 1 to 169 may be employed to dye polyamide in accordance with the method given for Application Example A.

The dyeings have good light fastness and good wet fastness properties.

APPLICATION EXAMPLE B (Printing of polyamide fabric)

Polyamide is printed with a printing paste containing:
30 parts of the dyestuff of Examle 1, 2 or 3
50 parts of urea
50 parts of a solubilising agent (e.g., thiodiethylene glycol)
290 parts of water
500 parts of a thickening agent (e.g., one based on carob bean gum)
20 parts of an acid-donating agent (e.g., ammonium tartrate)
60 parts of thiourea.

The printed textile goods are steamed for 40 minutes at 102° (saturated steam), rinsed cold, washed at 60° for 5 minutes with a dilute solution of a conventional detergent and rinsed again with cold water. A yellow (red) print is obtained having good light and wet fastness properties.

In analogous manner printing pastes may be prepared employing the dyestuffs of Examples 4 to 169 or a mixture of two or more dyes of Examples 1 to 169. Such pastes may be employed for printing in accordance with the above given procedure.

APPLICATION EXAMPLE C (Continuous dyeing of polyamide carpet)

Polyamide (e.g., regular nylon 6 or regular nylon 66) carpet is wetted out with a composition consisting of 1-2 parts of decyl alcohol ethoxylated with 4 moles of ethylene oxide per mole of alcohol or a similar surfactant and 998-999 parts of water and squeezed to impregnate the wetting agent and reduce the total pick-up to 80-100%.

A dye liquor consisting of:

0.5–5 parts of the dyestuff of Example 1 or 3
1–2 parts of a guar thickener (e.g., Celca Gum D-49-D)
1–2 parts of decyl alcohol ethoxylated with 4 moles of ethylene oxide per mole of alcohol (or a similar surfactant)
91–97.5 parts of water sufficient trisodium phosphate or acetic acid to adjust the pH to 5 for, e.g., regular nylon 6 and regular nylon 66 is applied to the wetted polyamide carpet using a continuous applicator (e.g., Kuesters) to achieve a wet pick-up of 300–600%. The yellow (red) dyed polyamide carpet is then steamed in a vertical or horizontal steamer for 4–10 minutes, rinsed with warm water and dried.

In analogous manner as described in Application Example C dyeing can be carried out applying a dye liquor which contains a dyestuff of Examples 2 or 4 to 169 or a mixture of one or more dyestuffs of Examples 1 to 169 instead of the dyestuff of Example 1 or 3.

According to the method described in Application Examples A to C a dye combination (a) to (e) containing the following components can also be applied:
  (a) 3.8 parts dyestuff of Example 1
    1.7 parts dyestuff C.I. Acid Blue 40 (or C.I. Acid Blue 324).
    A green dyeing or print is obtained.
  (b) 2.4 parts dyestuff of Example 1
    1.2 parts dyestuff of Example 2 or 3 (or dyestuff C.I. Acid Red 57, 266 or 361)
    1.3 parts C.I. Acid Blue 324 (or C.I. Acid Blue 288).
    A neutral-brown shade is obtained.
  (c) 2.55 parts dyestuff of Example 1
    0.6 parts dyestuff of Example 2 or 3 (or dyestuff C.I. Acid Red 57, 266 or 361)
    1.3 parts C.I. Acid Blue 342.
    An olive shade is obtained.
  (d) 2.8 parts C.I. Acid Orange 156
    0.3 parts dyestuff of Example 2 or 3
    1.2 parts C.I. Acid Blue 324.
    An olive shade is obtained.
  (e) 2.5 parts C.I. Acid Yellow 49
    2.1 parts dyestuff of Example 2 or 3
    1.0 parts C.I. Acid Blue 324.
    A reddish-brown shade is obtained.

Preferably, these dyestuff combinations are applied to the following substrates in accordance with the conventional exhaust or continuous dyeing or printing process:
helanca tricot
polyamide-66 yarn
polyamide-6 cut loop carpet fabric
polyamide-66 tufted raw material carpet.

The dyeings obtained on these substrates are fast to light and particularly are level dyeings.

What is claimed is:
1. A compound of the formula

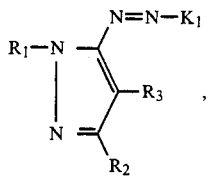

or a salt thereof each cation of which is independently a non-chromophoric cation,
wherein
$K_1$ is

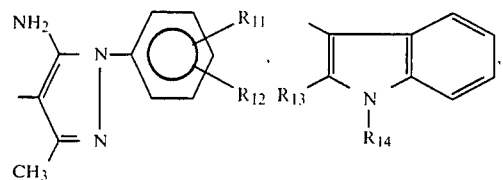

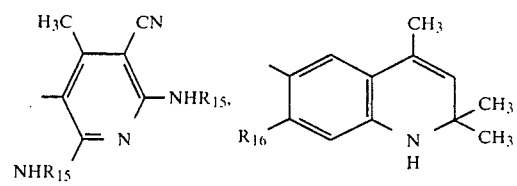

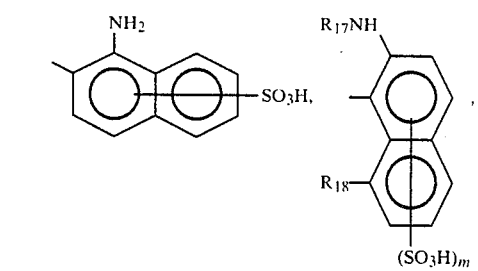

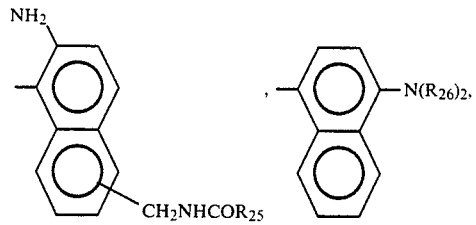

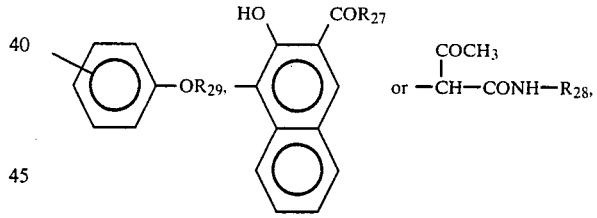

wherein
$R_{11}$ is hydrogen, $C_{1-4}$alkyl, $C_{1-4}$alkoxy, chloro, bromo or sulfo,
$R_{12}$ is hydrogen, $C_{1-4}$alkyl, $C_{1-4}$alkoxy, chloro or bromo,
$R_{13}$ is methyl or phenyl,
$R_{14}$ is hydrogen or $C_{1-4}$alkyl,
each $R_{15}$ is independently hydrogen, $C_{1-4}$alkyl or $C_{1-4}$alkyl monosubstituted by hydroxy, chloro or cyano,
$R_{16}$ is hydrogen, methyl or —NHCOCH$_3$,
$R_{17}$ is hydrogen; $C_{1-4}$alkyl; $C_{1-4}$alkyl monosubstituted by hydroxy; phenyl or phenyl substituted by 1 to 3 substituents selected from chloro, $C_{1-4}$-alkyl, $C_{1-4}$-alkoxy and sulfo,
$R_{18}$ is hydrogen or hydroxy,
$R_{25}$ is $C_{1-4}$alkyl; $C_{1-4}$alkyl monosubstituted by chloro, cyano or methoxy; phenyl or phenyl monosubstituted by chloro, methyl, methoxy, cyano or —CONH$_2$, each $R_{26}$ is independently hydrogen, $C_{1-4}$alkyl or $C_{1-4}$alkyl monosubstituted by hydroxy, cyano, chloro or methoxy, $R_{27}$ is hydroxy or phenylamino, $R_{28}$ is $C_{1-4}$alkyl; phenyl; phenyl substituted by 1 or 2 substituents selected from chloro, methyl, methoxy and sulfo; phenyl($C_{1-4}$alkyl) or phenyl($C_{1-4}$alkyl) the phenyl group of which is substituted by 1 or 2 substituents selected from chloro, methyl, methoxy and sulfo, $R_{29}$ is hydrogen or $C_{1-2}$alkyl, and m is 0 or 1, $R_1$ is $C_{1-6}$alkyl; $C_{1-6}$alkyl substituted by 1 or 2 substituents selected from chloro, cyano, hydroxy, $C_{1-4}$alkoxy, phenyl and phenyl substituted by 1 or 2 substituents selected from chloro, $C_{1-4}$alkyl, $C_{1-4}$alkoxy, carboxy, sulfo, —$SO_2NH_2$ and —NHCOCH$_3$; $C_{5-7}$cycloalkyl; $C_{5-7}$cycloalkyl substituted by 1 to 3 $C_{1-4}$alkyl groups; phenyl; phenyl substituted by 1 to 3 substituents selected from chloro, $C_{1-4}$alkyl, $C_{1-4}$alkoxy, —NHCOCH$_3$ (maximum of 1), carboxy (maximum of 1), sulfo (maximum of 1) and —$SO_2NR_7R_8$ (maximum of 1); 1- or 2-naphthyl or 1- or 2-naphthyl substituted by sulfo, wherein
each of $R_7$ and $R_8$ is independently hydrogen; $C_{1-4}$alkyl; $C_{1-4}$alkyl monosubstituted by hydroxy or phenyl; cyclohexyl; phenyl or phenyl monosubstituted by chloro, methyl or methoxy, or —$NR_7R_8$ is a 5- or 6-membered saturated or unsaturated ring containing 1 or 2 hetero atoms, $R_2$ is hydrogen; $C_{1-4}$alkyl; $C_{1-4}$alkyl monosubstituted by hydroxy, chloro, cyano, $C_{1-4}$alkoxy, phenyl or phenyl substituted by 1 or 2 substituents selected from chloro, methyl, methoxy, sulfo and —$SO_2NH_2$; $C_{1-4}$alkoxy; cyano; phenyl; phenoxy; or phenyl or phenoxy monosubstituted by chloro, methyl, methoxy or sulfo, and $R_3$ is cyano, —$CONH_2$, —$COOR_4$, sulfo or —$SO_2NR_5R_6$, wherein
$R_4$ is hydrogen, $C_{1-4}$alkyl, phenyl or phenyl($C_{1-4}$alkyl), and
each of $R_5$ and $R_6$ is independently hydrogen; $C_{1-4}$alkyl; $C_{1-4}$alkyl monosubstituted by hydroxy or phenyl; cyclohexyl; phenyl or phenyl monosubstituted by chloro, methyl or methoxy, or
—$NR_5R_6$ is a 5- or 6-membered saturated or unsaturated ring containing 1 or 2 hetero atoms, with the provisos that (i) the total number of sulfo groups is 1 or 2, and (ii) in any hydroxy-substituted alkyl group attached to a nitrogen atom, the hydroxy group is attached to a carbon atom other than the carbon atom attached to the nitrogen atom.

2. A compound according to claim 1, or a salt thereof each cation of which is independently a non-chromophoric cation,
wherein
when —$NR_5R_6$ is a 5- or 6-membered saturated or unsaturated ring containing 1 or 2 hetero atoms, it is piperidino, morpholino, piperazino or N-methylpiperazino, and
when —$NR_7R_8$ is a 5- or 6-membered saturated or unsaturated ring containing 1 to 2 hetero atoms, it is piperidino, morpholino, piperazino or N-methylpiperazino.

3. A compound according to claim 2, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

4. A compound according to claim 3, or a salt thereof each cation of which is independently lithium, sodium, potassium or ammonium.

5. A compound according to claim 4, or a salt thereof each cation of which is sodium.

6. A compound according to claim 2, or a salt thereof each cation of which is independently a non-chromophoric cation,
with the proviso that the compound contains a single sulfo group.

7. A compound according to claim 2, or a salt thereof each cation of which is independently a non-chromophoric cation,
wherein
$R_1$ is $C_{1-2}$alkyl; $C_{1-4}$alkyl monosubstituted by hydroxy, chloro, cyano, $C_{1-2}$alkoxy, phenyl or phenyl substituted by 1 or 2 substituents selected from chloro, methyl, methoxy, sulfo and —NHCOCH$_3$; cyclohexyl; phenyl; phenyl substituted by 1 or 2 substituents selected from chloro, methyl, methoxy, sulfo (maximum of 1) and —$SO_2NHR_{7a}$ (maximum of 1); 1- or 2-naphthyl or 1- or 2-naphthyl monosubstituted by sulfo, wherein $R_{7a}$ is hydrogen or $C_{1-4}$alkyl.

8. A compound according to claim 7, or a salt thereof each cation of which is independently a non-chromophoric cation,
wherein
$R_1$ is methyl; $C_{1-4}$alkyl monosubstituted by hydroxy, phenyl or sulfophenyl; phenyl or phenyl monosubstituted by chloro or sulfo.

9. A compound according to claim 2, or a salt thereof each cation of which is independently a non-chromophoric cation,
wherein
$R_2$ is hydrogen, $C_{1-2}$alkyl or $C_{1-4}$alkyl monosubstituted by hydroxy, phenyl or sulfophenyl.

10. A compound according to claim 2, or a salt thereof each cation of which is independently a non-chromophoric cation,
wherein
$R_3$ is cyano, sulfo, —$CONH_2$, —$COOR_{4b}$ or —$SO_2NR_{5b}R_{6b}$,
wherein
$R_{4b}$ is hydrogen, methyl, ethyl or benzyl,
$R_{5b}$ is hydrogen, $C_{1-2}$alkyl, benzyl, cyclohexyl or phenyl, and
$R_{6b}$ is hydrogen, or
—$NR_{5b}R_{6b}$ is morpholino.

11. A compound according to claim 10 having the formula

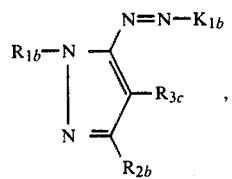

or a salt thereof each cation of which is independently a non-chromophoric cation,
wherein $K_{1b}$ is

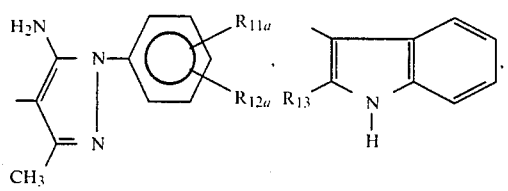

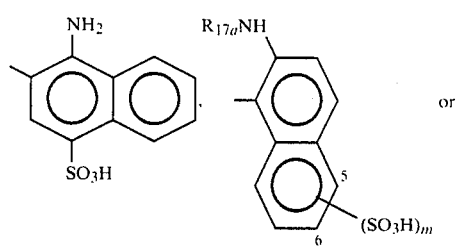

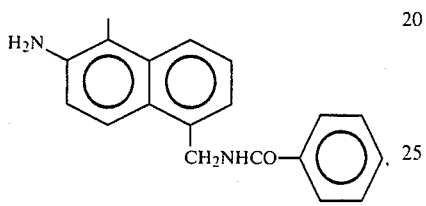

wherein
$R_{11a}$ is hydrogen, methyl, methoxy, chloro or sulfo,
$R_{12a}$ is hydrogen, methyl, methoxy or chloro,
$R_{13}$ is methyl or phenyl,
$R_{17a}$ is hydrogen; $C_{1-2}$alkyl; $C_{2-3}$hydroxyalkyl; phenyl; phenyl substituted by 1 or 2 methyl groups or phenyl substituted by sulfo and 1 or 2 methyl groups, and
m is 0 or 1,
with the proviso that when m is 1, the sulfo group is in the 5- or 6-position,
$R_{1b}$ is methyl; $C_{1-4}$alkyl monosubstituted by hydroxy, phenyl or sulfophenyl; phenyl or phenyl monosubstituted by chloro or sulfo,
$R_{2b}$ is hydrogen; $C_{1-2}$alkyl or $C_{1-4}$alkyl monosubstituted by hydroxy, phenyl or sulfophenyl, and
$R_{3c}$ is cyano, sulfo, —$CONH_2$ or —$SO_2NHR_{5c}$,
wherein $R_{5c}$ is hydrogen or $C_{1-2}$alkyl,
with the proviso that the compound contains a single sulfo group.

12. A compound according to claim 11, or a salt thereof each cation of which is independently a non-chromophoric cation,
wherein
$R_{1b}$ is phenyl or sulfophenyl.

13. A compound according to claim 11, or a salt thereof each cation of which is independently a non-chromophoric cation,
wherein
$R_{2b}$ is hydrogen or methyl.

14. A compound according to claim 13, or a salt thereof each cation of which is independently a non-chromophoric cation,
wherein
$R_{2b}$ is hydrogen.

15. A compound according to claim 11, or a salt thereof each cation of which is independently a non-chromophoric cation,
wherein
$R_{3c}$ is cyano or sulfo.

16. A compound according to claim 11, or a salt thereof each cation of which is independently a non-chromophoric cation,
wherein
$K_{1b}$ is

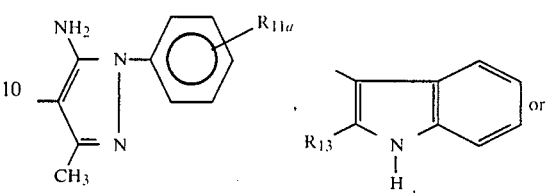

wherein
$R_{11a}$ is hydrogen, methyl, methoxy, chloro or sulfo, and
$R_{13}$ is methyl or phenyl,
with the proviso that the sulfo group on ring F is in the 5- or 6-position,m
$R_{1b}$ is phenyl, chlorophenyl or sulfophenyl,
$R_{2b}$ is hydrogen or methyl, and
$R_{3c}$ is cyano, sulfo or —$CONH_2$.

17. The compound according to claim 16 having the formula

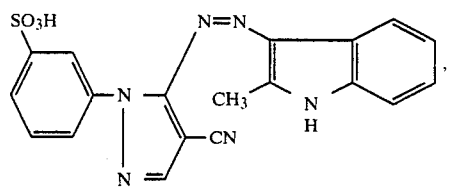

or salt thereof the cation of which is a non-chromophoric cation.

18. The compound according to claim 16 having the formula

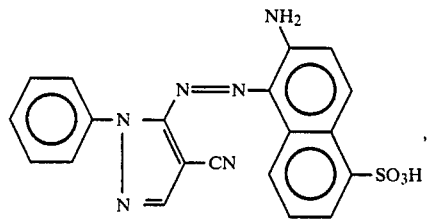

or a salt thereof the cation of which is a non-chromophoric cation.

19. A process for dyeing or printing an anionically dyeable substrate comprising applying to an anionically dyeable substrate a compound according to claim 1 as dyeing or printing agent.

20. A process according to claim 19, wherein the anionically dyeable substrate is leather, a textile containing or consisting of natural or a synthetic polyamide or nylon carpet.

* * * * *